United States Patent
Raines et al.

(10) Patent No.: US 6,837,581 B1
(45) Date of Patent: Jan. 4, 2005

(54) SYSTEM AND METHOD FOR DEPLOYING A MIRROR ASSEMBLY OF A DISPLAY UNIT

(75) Inventors: Aaron Raines, Dallas, TX (US); Eduardo Gracia, Mesquite, TX (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 10/627,549

(22) Filed: Jul. 25, 2003

Related U.S. Application Data

(60) Provisional application No. 60/399,617, filed on Jul. 29, 2002.

(51) Int. Cl.[7] .................. G03B 21/00; G03B 21/28; G02B 7/18
(52) U.S. Cl. ..................... 353/13; 353/99; 353/98; 359/841
(58) Field of Search ................ 359/841–844, 359/871–874, 848, 876, 881; 345/87, 205–207, 5, 7–9; 353/11–14, 28, 77, 98, 99, 119, 122; 248/576, 592–594, 472, 473, 476–479

(56) References Cited

U.S. PATENT DOCUMENTS

| | | | | |
|---|---|---|---|---|
| 5,296,868 A | * | 3/1994 | Itami et al. | 345/7 |
| 5,414,439 A | | 5/1995 | Groves et al. | 345/7 |
| 6,049,288 A | * | 4/2000 | Kawasaki | 340/815.4 |
| 6,343,863 B1 | * | 2/2002 | Wood | 353/13 |
| 6,504,518 B1 | * | 1/2003 | Kuwayama et al. | 345/7 |
| 2002/0018182 A1 | * | 2/2002 | Aoki | 353/13 |

FOREIGN PATENT DOCUMENTS

| | | | | |
|---|---|---|---|---|
| EP | 0 398 346 A2 | 11/1990 | | G02B/27/00 |
| EP | 0 677 955 A2 | 10/1995 | | H04N/5/33 |
| EP | 0 824 216 A1 | 2/1998 | | G02B/27/01 |

OTHER PUBLICATIONS

PCT International Search Report for PCT US03/23607, 7 pages, Nov. 25, 2003.

* cited by examiner

*Primary Examiner*—David Gray
*Assistant Examiner*—Andrew Sever
(74) *Attorney, Agent, or Firm*—Baker Botts L.L.P.

(57) ABSTRACT

A mirror assembly deployment system of a display unit includes an imaging mirror and an extension link assembly coupled to the imaging mirror. The extension link assembly includes an extension spring coupled to a housing of the display unit. The deployment system includes a compression link assembly coupled to the extension link assembly, wherein the compression link assembly comprises a compression spring. The system also includes a fold mirror coupled to the compression link assembly. The extension spring is configured to at least partially unload when the imaging mirror is released from a recessed position to cause the imaging mirror to rotate to an at least partially deployed position. The compression spring is configured to unload when the extension spring at least partially unloads to cause the fold mirror to rotate from a recessed position to a deployed position.

18 Claims, 7 Drawing Sheets

SYSTEM AND METHOD FOR DEPLOYING A MIRROR ASSEMBLY OF A DISPLAY UNIT

RELATED APPLICATION

This application claims the benefit of U.S. provisional application Ser. No. 60/399,617, filed Jul. 29, 2002, entitled Method and System for Deploying a Mirror Assembly of a Display Unit.

TECHNICAL FIELD OF THE INVENTION

This invention relates generally to display units and, more particularly, to a system and method for deploying a mirror assembly of a display unit.

BACKGROUND OF THE INVENTION

During daylight hours, the driver of a vehicle is able to readily detect and recognize objects that would be difficult or impossible to detect or recognize at night. Consequently, in order to supplement the natural vision of a driver, and thus reduce the risk of accidents, night vision systems have been developed for vehicles, including automobiles sold in the consumer market. Typical night vision systems include an infrared camera unit, which gathers information regarding the scene in front of the vehicle, mounted in the grill of the vehicle and a head-up display, which projects an image derived from information provided by the camera unit onto an imaging mirror for view by the driver of the vehicle.

SUMMARY OF THE INVENTION

The present invention provides a system and method for deploying a mirror assembly of a display unit that substantially eliminates or reduces at least some of the disadvantages and problems associated with previous systems and methods.

In accordance with a particular embodiment of the present invention, a mirror assembly deployment system of a display unit includes an imaging mirror and an extension link assembly coupled to the imaging mirror. The extension link assembly includes an extension spring coupled to a housing of the display unit. The deployment system includes a compression link assembly coupled to the extension link assembly, wherein the compression link assembly comprises a compression spring. The system also includes a fold mirror coupled to the compression link assembly. The extension spring is configured to at least partially unload when the imaging mirror is released from a recessed position to cause the imaging mirror to rotate to an at least partially deployed position. The compression spring is configured to unload when the extension spring at least partially unloads to cause the fold mirror to rotate from a recessed position to a deployed position.

In accordance with another embodiment, a method for deploying a mirror assembly of a display unit includes releasing an imaging mirror from a recessed position. The imaging mirror is coupled to an extension link assembly. The method includes at least partially unloading an extension spring of the extension link assembly thereby causing lateral movement of the extension link assembly to rotate the imaging mirror from a recessed position to a first position. The method includes unloading a compression spring of a compression link assembly coupled to a fold mirror of the mirror assembly thereby causing rotation of the fold mirror from a recessed position to a deployed position.

The method may also include rotating the imaging mirror from the first position to a second position suitable for presenting an image to a user. Unloading a compression spring of a compression link assembly may comprise rotating a pivot assembly coupled to the extension link assembly and the compression link assembly to unload the compression spring of the compression link assembly.

In accordance with another embodiment, a method for displaying an image at a display unit includes receiving an image from a video source coupled to the display unit. The method includes releasing an imaging mirror from a recessed position. The imaging mirror is coupled to an extension link assembly. The method includes at least partially unloading an extension spring of the extension link assembly thereby causing lateral movement of the extension link assembly to rotate the imaging mirror from a recessed position to an at least partially deployed position and unloading a compression spring of a compression link assembly coupled to a fold mirror of the mirror assembly thereby causing rotation of the fold mirror from a recessed position to a deployed position. The method also includes projecting the image onto the fold mirror and reflecting the image onto the imaging mirror. Receiving an image from a video source may comprise receiving an image from a camera unit of an auxiliary vision system of a vehicle.

Technical advantages of particular embodiments of the present invention include a mirror deployment system that uses extension link and compression link assemblies to reduce jitter in an image produced by a display unit in which the system is used, while the display unit is in operation in a vehicle. Moreover, the system deploys a fold mirror when an imaging mirror is released and deployed, thereby negating the need to open the mirrors separately. Furthermore, the system reduces rattle of the fold mirror and the deployment components. Such rattle could be caused by the movement of a vehicle in which the display unit is being used. Any backlash or loose tolerances in the deployment of the fold mirror are also reduced in both the recessed and deployed positions.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of particular embodiments of the invention and their advantages, reference is now made to the following descriptions, taken in conjunction with the accompanying drawings, in which.

DETAILED DESCRIPTION OF THE INVENTION

Figure 1:
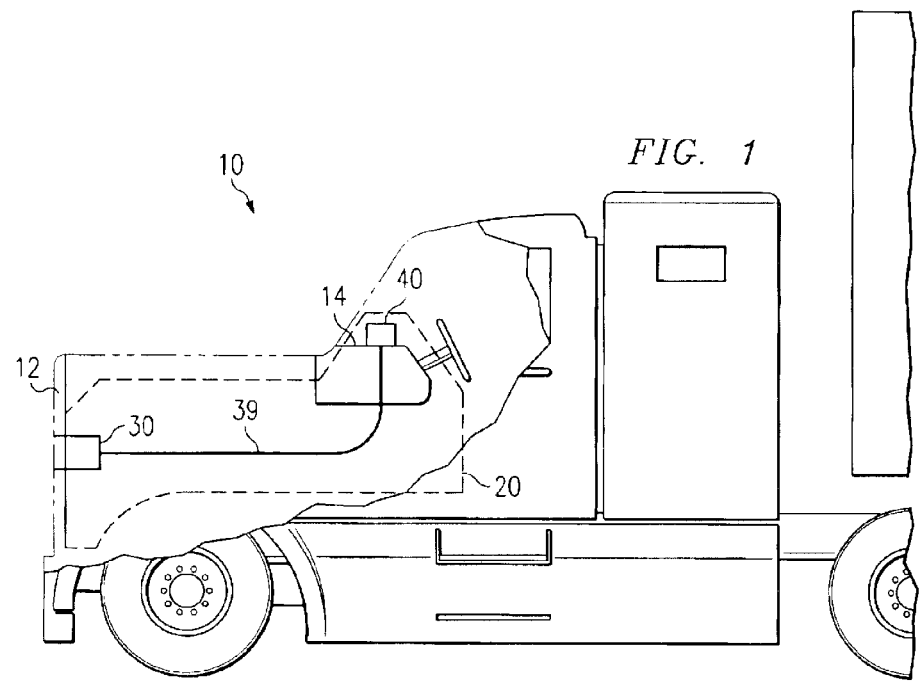
FIG. 1 is a diagrammatic view of a vehicle incorporating an auxiliary vision system, in accordance with an embodiment of the present invention.

FIG. 1 is a diagrammatic view of a vehicle 10 incorporating an auxiliary vision system 20 in accordance with an embodiment of the present invention. In this embodiment, vehicle 10 is a truck; however, in other embodiments vehicle 10 may be another type of vehicle, such as a recreation vehicle or a car. The auxiliary vision system 20 includes a camera unit 30, which in the illustrated embodiment is mounted at the front of vehicle 10, in the middle of a front grill 12. The camera unit 30 is electrically coupled at 39 to a display unit 40, which is also a part of the auxiliary vision system 20. The display unit 40 is of a type that is commonly known as a head-up display (HUD).

In the illustrated embodiment, the display unit 40 is set on dashboard 14 of the vehicle 10 and can project an image for reflection by a fold mirror of display unit 40 onto an imaging mirror of display unit 40 for display to the driver or a passenger. In particular embodiments, the display unit 40 may be inverted and mounted on the ceiling of vehicle 10 in a position above the dashboard for viewing by the driver or a passenger. Display unit 40 may also be otherwise positioned or mounted within vehicle 10.

When a driver is operating a vehicle at night, the driver's ability to see the road ahead is substantially more limited than would be case for the same section of road during daylight hours. This is particularly true in a rural area under conditions where there is little moonlight, there are no street lights, and there are no headlights of other vehicles.

One feature of auxiliary vision system 20 of FIG. 1 is the ability to provide the driver of the vehicle 10 with information above and beyond that which the driver can discern at night with the naked eye. In this regard, the camera unit 30 can detect infrared information at a distance well beyond the effective reach of the headlights of the vehicle 10. In the case of a life form such as an animal or a human, the heat signature of the life form, when presented in an infrared image derived from the camera unit 30, will usually have a significant contrast in comparison to the relatively hotter or cooler surrounding natural environment. As discussed above, this is not necessarily the case in a comparable nighttime image based on visible light.

Thus, in addition to the visible image that is directly observed by the driver through the windshield of the vehicle based on headlight illumination and any other available light, the auxiliary vision system 20 provides a separate and auxiliary image, based on infrared radiation, that is reflected onto the imaging mirror of auxiliary vision system 20 for view by the driver. This auxiliary image can provide a detectable representation of lifeforms or objects ahead that are not yet visible to the naked eye. Further, the auxiliary image can provide a much more striking contrast than a visible image between the lifeforms or objects and the surrounding scene. Note that the auxiliary vision system 20 may also be useful during daylight hours to supplement the view of objects seen with natural light.

Auxiliary vision system 20 may also include other components, such as an angle encoder and/or an inclinometer to provide information regarding the heading of vehicle 10, such as, for example, steering rate, inclination rate, and/or orientation. Other components may be utilized by auxiliary vision system 20 to present other types of information.

In particular embodiments, display unit 40 may be coupled to a video source other than camera unit 30 and may thus present other types of images. For example, in some embodiments the display unit may be coupled to a global positioning satellite (GPS) system, a dvd player or other component. Text messages, navigation information, dashboard information or other information or images may be displayed by display unit 40.

Figure 2:
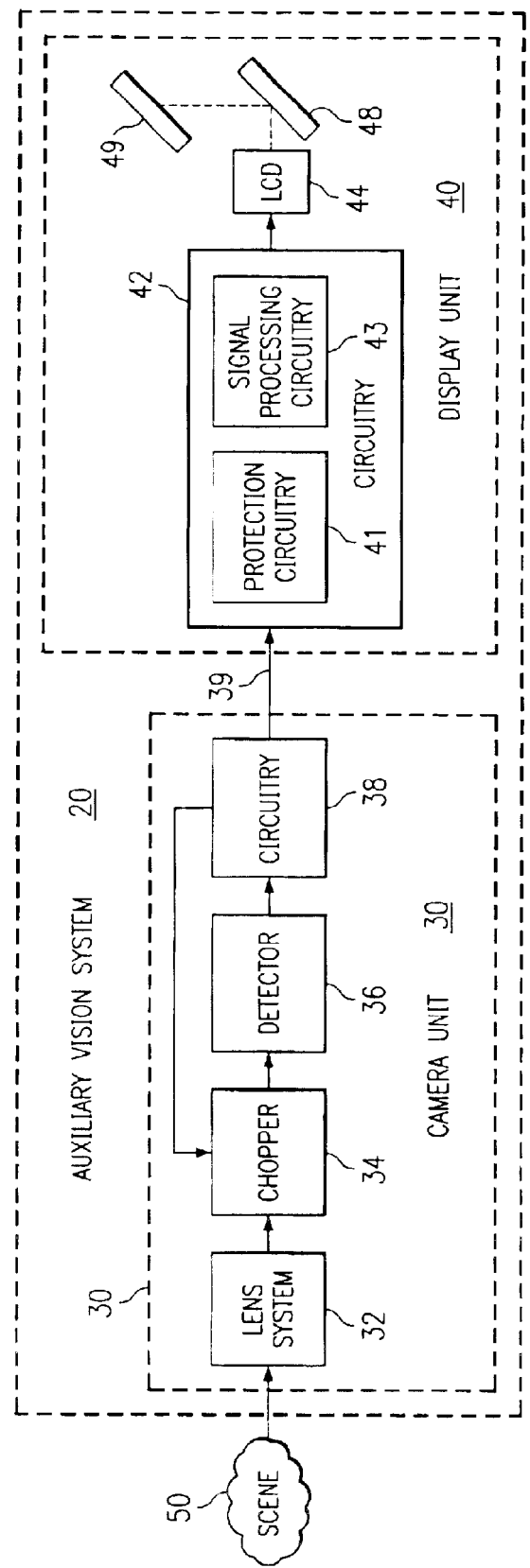
FIG. 2 is a diagrammatic view of the auxiliary vision system of FIG. 1, showing in greater detail the internal structure of a camera unit and a display unit, in accordance with an embodiment of the present invention.

FIG. 2 is a diagrammatic view of the auxiliary vision system 20 of FIG. 1, showing in greater detail the internal structure of both the camera unit 30 and the display unit 40, in accordance with an embodiment of the present invention. More specifically, thermal radiation from a scene 50 enters the camera unit 30 and passes through a lens system 32 and a chopper 34 to a detector 36. The lens system 32 directs the incoming radiation onto an image plane of the detector 36. The chopper 34 is a rotating disk of a known type. As the chopper 34 is rotated, it modulates the incoming infrared radiation to the detector 36.

The detector 36 may be a commercially available focal plane array or staring array detector, which has a two-dimensional matrix of detector elements, where each detector element produces a respective pixel of a resulting image. In particular embodiments, detector 36 may be an uncooled pyroelectric barium strontium titanate (BST) detector, although numerous other types of detectors would also be useful in auxiliary vision system 20.

The circuitry 38 is provided to control the detector 36 and read out the images that it detects, and also to synchronize the chopper 34 to operation of the detector 36. Further, the circuitry 38 sends the information obtained from detector 36 through the electrical coupling 39 to the circuitry 42 within the display unit 40.

The circuitry 42 includes protection circuitry 41 and signal processing circuitry 43. Protection circuitry 41 operates to protect display unit 40 from energy surges, such as load switching spikes and load dumps.

The circuitry 42 controls a liquid crystal display (LCD) 44, which in particular embodiments has a two-dimensional array of pixel elements. The display unit 40 has a horizontal to vertical aspect ratio of 3:1. Other embodiments may include a display unit having a different horizontal to vertical aspect ratio. The circuitry 42 takes successive images obtained from the detector 36 through circuitry 38 and presents these on the LCD 44. The LCD 44 may include backlighting that makes the image on LCD 44 visible at night.

This visible image is projected onto a fold mirror 48 that reflects the image so as to be directed onto imaging mirror 49, creating a virtual image for the driver. Although fold mirror 48 and imaging mirror 49 are shown diagrammatically in FIG. 2 as planar components, each may have a relatively complex curvature that is known in the art. The curvature may also give the mirrors some optical power, so that they impart a degree of magnification to the image.

Figure 3:
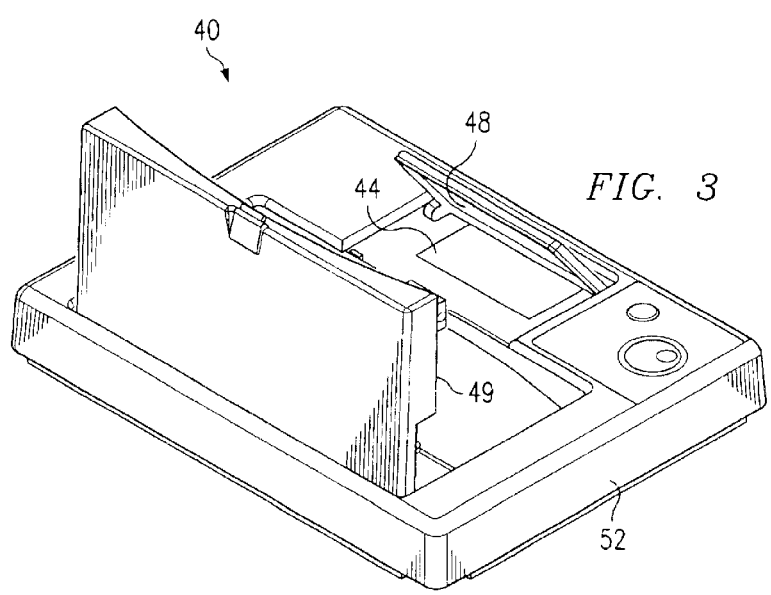
FIG. 3 is a diagrammatic perspective view of a display unit of an auxiliary vision system, in accordance with an embodiment of the present invention.
Figure 4:
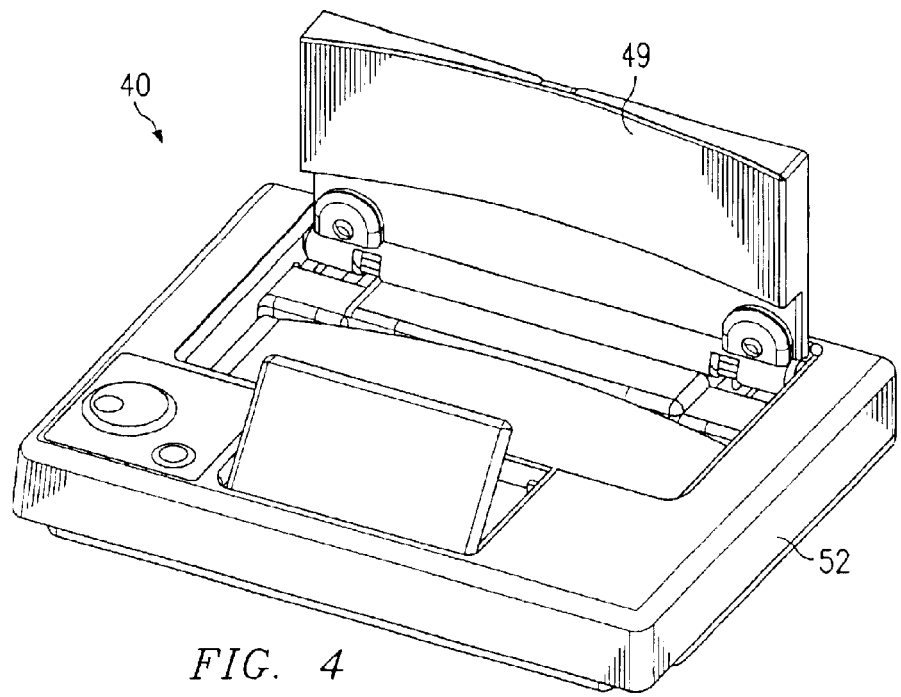
FIG. 4 is another diagrammatic perspective view of the display unit of FIG. 3.

FIG. 3 is a diagrammatic perspective view of display unit 40. FIG. 4 is another diagrammatic perspective view of the display unit 40, taken from a different angle. In particular embodiments, the display unit 40 may be mounted permanently or removably on top of the dashboard of a vehicle. It may also be mounted invertedly above the dashboard, in which case the image may be inverted by display unit 40 so that it is presented optimally to the driver or a passenger. The display unit 40 may also be positioned in other ways in a vehicle or may be moved from one vehicle to another. Because of its portability, display unit 40 is sometimes referred to as a notebook HUD.

The display unit 40 has an LCD 44, a planar fold mirror 48, and an aspheric imaging mirror 49. Radiation from the LCD 44 travels upwardly to the fold mirror 48 and is reflected toward the imaging mirror 49. This radiation is then reflected by the imaging mirror 49 directly toward the eye of the driver or a passenger. The imaging mirror 49 is supported for pivotal movement relative to a housing 52 and can be pivotally positioned so that the imaging mirror 49 is in a comfortably viewable position for the driver or a passenger. The fold mirror 48 is also supported for pivotal movement.

Figure 5:
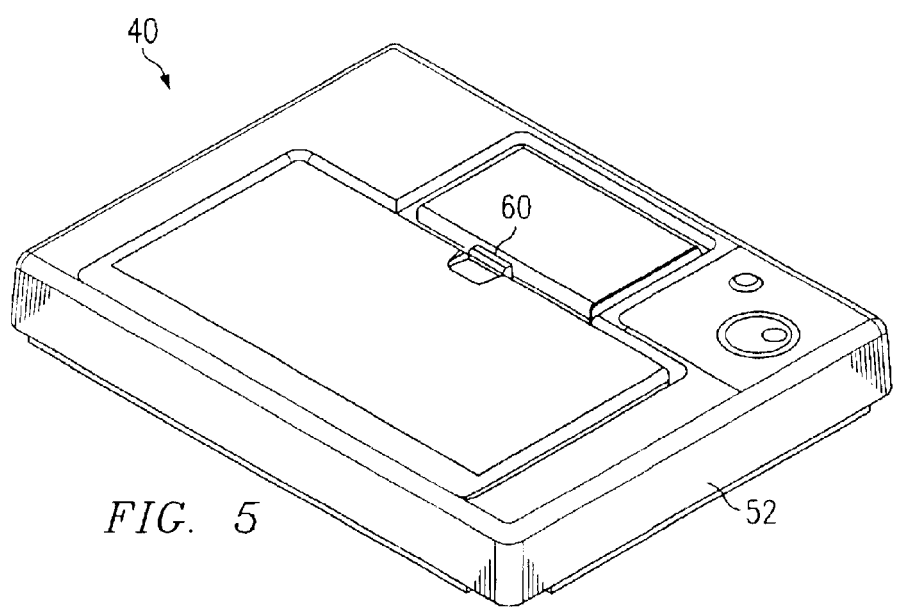
FIG. 5 is a diagrammatic perspective view of a display unit with the imaging mirror and the fold mirror in a recessed, non-operational position, in accordance with an embodiment of the present invention.

When the display unit 40 is not being used, the mirrors 48 and 49 can both be pivoted downwardly to a non-operational position in which they are both substantially horizontal. In this regard, FIG. 5 is a diagrammatic perspective view of the display unit 40, and shows the substantially horizontal positions of the mirrors 48 and 49. The ability of mirrors 48 and 49 to pivot to a substantially horizontal position when not in use allows display unit 40 to have a relatively thin profile.

The deployment of mirrors 48 and 49 begins with the release of a latch 60. When latch 60 is released, imaging mirror 49 (and the panel supporting imaging mirror 49) releases and deploys to a partially-opened position, and fold mirror 48 (and the panel supporting fold mirror 48) deploys to its full open position. The imaging mirror 49 may then be opened further to an optimum viewing angle for the driver or a passenger with no further movement of the fold mirror 48. The mechanism for the deployment of mirrors 48 and 49 is described in further detail below.

Figure 6:
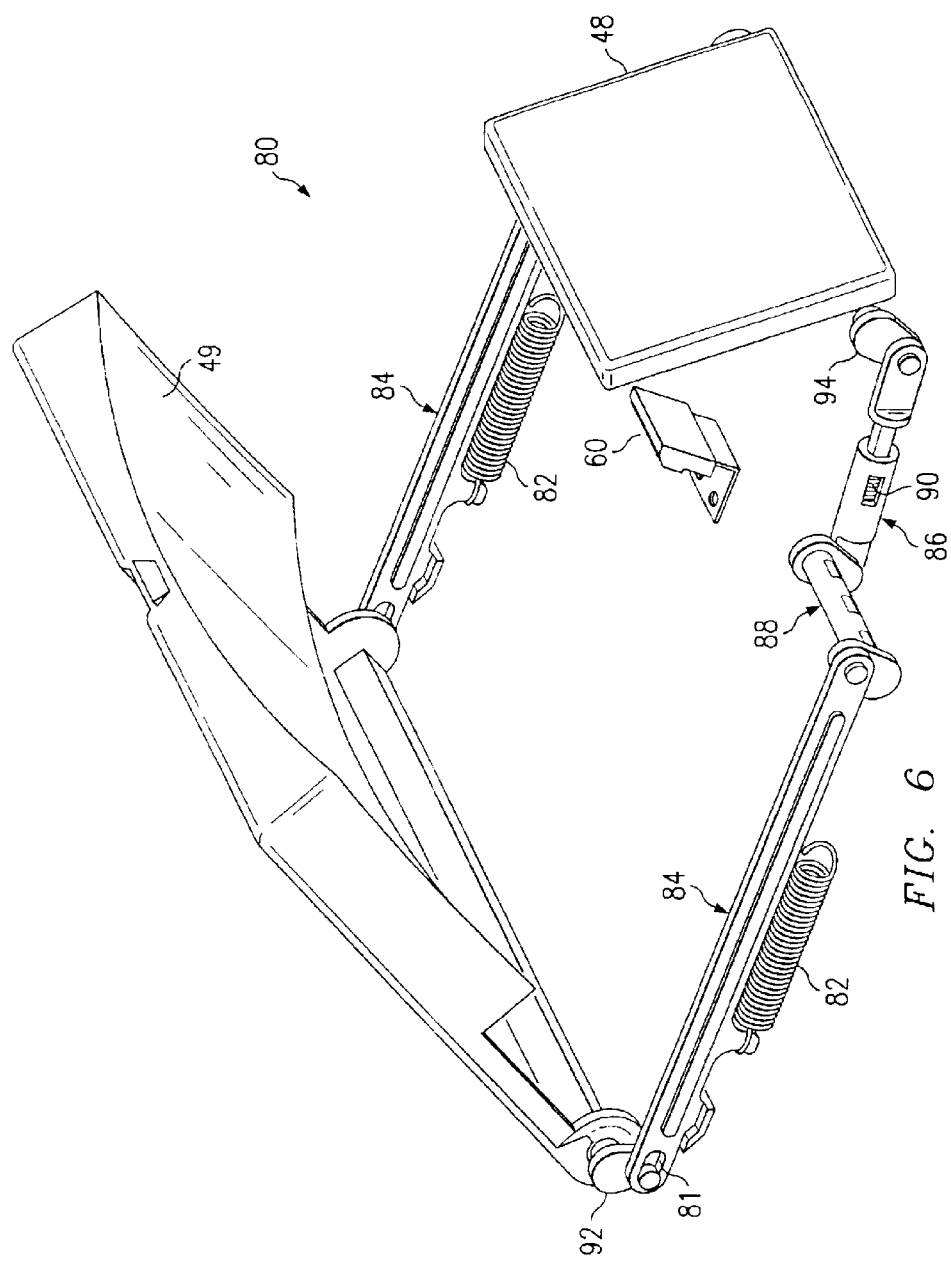
FIG. 6 is a diagrammatic isometric view of a mirror deployment system of a display unit, in accordance with an embodiment of the present invention.

FIG. 6 illustrates a mirror deployment system 80 for deploying a mirror assembly that comprises the imaging mirror 49 and the fold mirror 48 of display unit 40. Imaging mirror 49 is illustrated in a partially-deployed position, and fold mirror 48 is illustrated in a fully-deployed position. System 80 is illustrated without the housing 52 of display unit 40 (illustrated in FIGS. 3–5) for clarity. System 80 includes imaging mirror extension link assembly 84, fold mirror compression link assembly 86, pivot assembly 88 and latch 60.

Extension link assembly 84 includes extension springs 82, and compression link assembly 86 includes compression spring 90. Imaging mirror 49 is coupled to a hinge 92 which protrudes through a slot 81 of extension link assembly 84. Fold member 48 is coupled to a hinge 94 which is coupled to compression link assembly 86. Pivot assembly 88 is coupled to both extension link assembly 84 and compression link assembly 86. It should be understood that portions of system 80 are hidden from view, such as another pivot assembly 88 and another hinge 94. However, such hidden portions are substantially similar to their counterpart illustrated portions.

Figure 7:
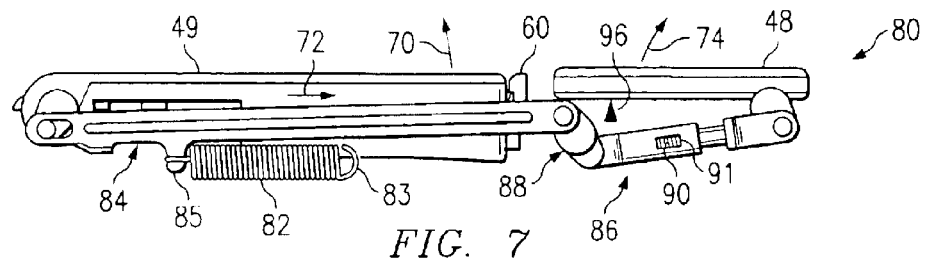
FIG. 7 is a diagrammatic side view of the mirror deployment system of FIG. 6, with the imaging and fold mirrors in a recessed, non-operational position.

FIG. 7 illustrates a side view of mirror deployment system 80 with imaging mirror 49 and fold mirror 48 in a recessed, non-operational position (as illustrated in FIG. 5). Again, system 80 is illustrated without the housing 52 of display unit 40 for clarity. Extension spring 82 includes a latch 83 that hooks onto a member of the housing (not shown). Extension spring 82 also latches onto a protruding member 85 of extension link assembly 84 at its other end. When imaging mirror 49 is recessed in display unit 40 in a non-operational position, extension spring 82 is fully loaded. Likewise, when fold mirror 48 is recessed in a non-operational position, compression spring 90 (part of which can be seen through slot 91 of compression link assembly 86) is fully loaded. Fold mirror 48 is positioned against a stop 96 of the housing when fold mirror 48 is in a recessed, non-operational position.

When a user, such as a driver or passenger of a vehicle, desires to deploy imaging mirror 49 and fold mirror 48 for operation, the user releases imaging mirror 49 through latch 60. When this occurs, extension spring 82 begins to unload, pulling extension link assembly 84 in the general direction represented by arrow 72. This action begins the rotational deployment of imaging mirror 49 in the general direction represented by arrow 70. The movement of extension link assembly 84 causes pivot assembly 88 to rotate in a generally clockwise direction in the illustrated diagram. Such rotation of pivot assembly 88 causes compression spring 90 to unload, thereby causing the rotational deployment of fold mirror 48 in the general direction represented by arrow 74.

Figure 8:
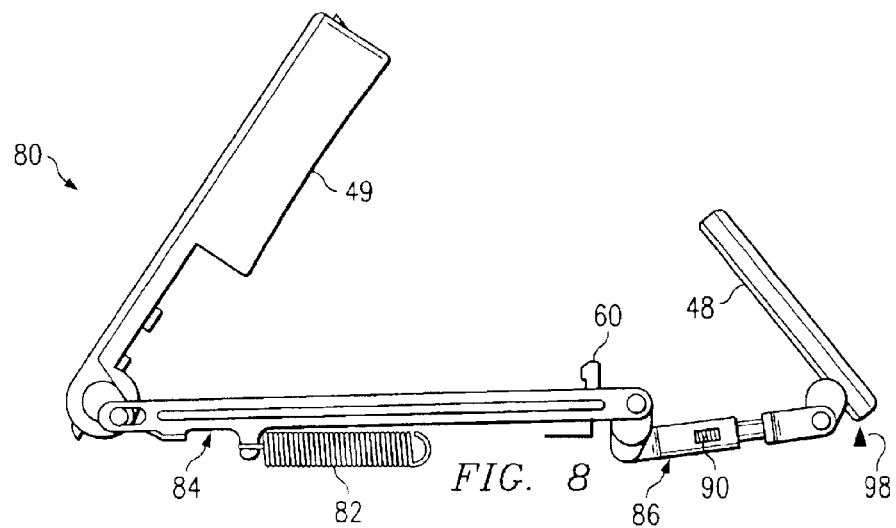
FIG. 8 is a diagrammatic side view of the mirror deployment system of FIG. 6, with the imaging mirror partially deployed and the fold mirror fully deployed.

FIG. 8 illustrates mirror deployment system 80 in a partially deployed position after the release of imaging mirror 49 and the deployment described above with respect to FIG. 7. Imaging mirror 49 is partially deployed, and extension spring 82 is still partially loaded in this position. In particular embodiments, in this partially deployed position which results after latch 60 releases the imaging mirror 49, imaging mirror 49 may be at approximately 45 to 60 degrees (for example, 53 degrees) relative to a horizontal, recessed position. Fold mirror 48 is fully deployed and is in its operational position. Compression spring 90 is fully unloaded. When fold member 48 deploys as described above with respect to FIG. 7, it contacts a stop 98 of the housing. Stop 98 helps to prevent fold mirror 49 from opening too far. To position imaging mirror 49 for operation, a user manually further rotates the imaging mirror 49 to an optimal position for viewing.

Figure 9:
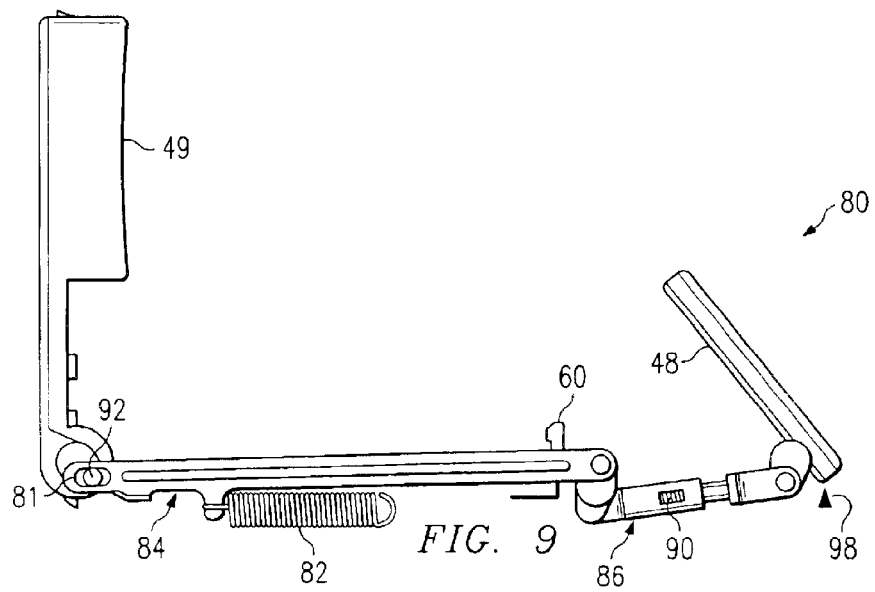
FIG. 9 is a diagrammatic side view of the mirror deployment system of FIG. 6, with the imaging and fold mirrors fully deployed.

FIG. 9 illustrates mirror deployment system 80 in a fully deployed and operational position. Imaging mirror 49 has been manually rotated to an operational position by a user. When the user moves imaging mirror 49 to a position for optimal viewing from the partially deployed position illustrated in FIG. 8, the hinge 92 coupled to imaging mirror 49 slides in the slot 81 of extension link assembly 84. This allows the imaging mirror 49 to be further rotated from its partially deployed position of FIG. 8 to an optimal viewing angle without causing movement of the fold mirror 48 (which is already in a fully deployed an operational position) or other components of the mirror deployment system 80. In particular embodiments, the release of the imaging mirror described with respect to FIG. 7 may result in deployment of the imaging mirror to a fully deployed and operational position suitable for presenting an image to a user for optimal viewing without further manual rotation.

When a user desires to close the mirrors 4B and 49, the manual closing by the user of mirror 48 causes the extension link assembly 84 to move back into its position illustrated in FIG. 7 thereby loading the extension spring 82. The movement of the extension link assembly 84 causes the compression link assembly 86 to move back into its position illustrated in FIG. 7, thereby loading the compression spring 90 and returning fold mirror 48 to its non-operational, recessed position. Since extension spring 82 and compression spring 90 are again loaded, they are ready for re-deployment when imaging mirror 48 is released through latch 60 by a user.

Figure 10:
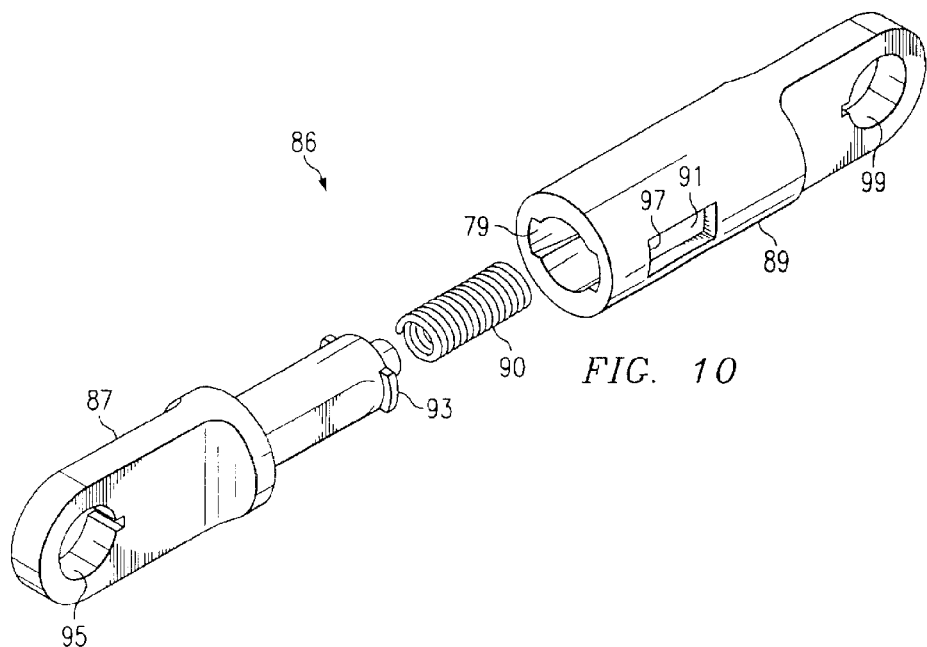
FIG. 10 is a diagrammatic isometric view of a compression link assembly of a mirror deployment system, in accordance with an embodiment of the present invention.

FIG. 10 further illustrates compression link assembly 86 of mirror deployment system 80. Compression link assembly 86 includes compression spring 90 between assembly members 87 and 89. During operation of system 80, compression spring 90 is positioned within a hollow 79 of assembly member 89. Compression link assembly 86 is coupled to pivot assembly 88 (not shown) through slot 95 and to fold mirror 48 (not shown) through slot 99. Protuberance 93 of assembly member 87 is positioned within slot 91 of assembly member 89 when system 80 is installed in the display unit 40. When fold mirror 48 is in a recessed and non-operational position, protuberance 93 is positioned within slot 91 away from end 97 of slot 91. During the deployment procedure, the unloading of the compression spring 90 causes assembly member 89 to move relative to assembly member 87, and protuberance 93 slides proximate end 97 of slot 91.

Figure 11:
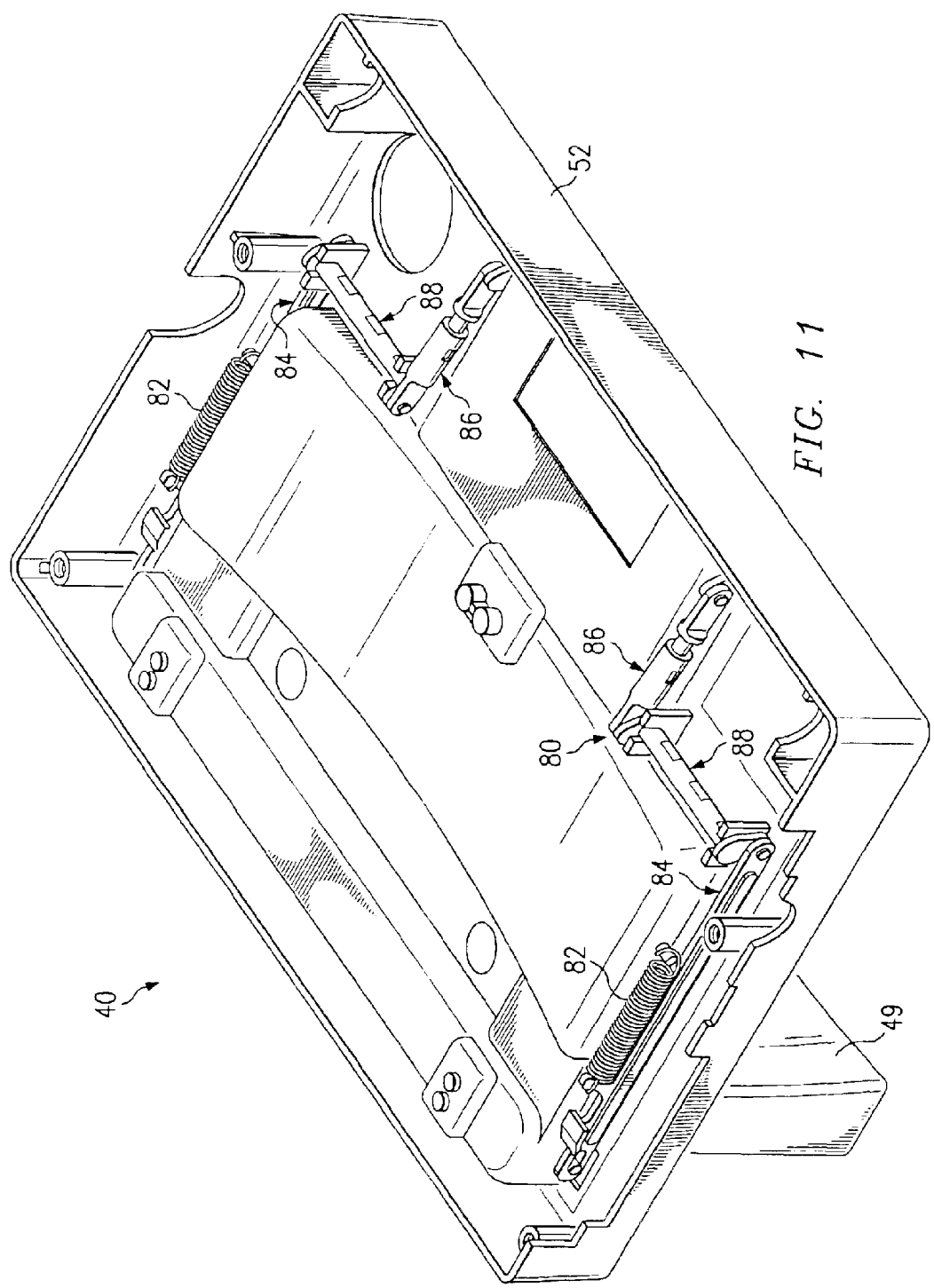
FIG. 11 is a diagrammatic bottom view of a housing of a display unit with a mirror deployment system, in accordance with an embodiment of the present invention.

FIG. 11 illustrates a bottom view of display unit 40 with the mirror deployment system 80 installed within the housing 52. Housing 52 is illustrated without a bottom panel for clarity. Extension springs 82, extension link assemblies 84, pivot assemblies 88, compression link assemblies 86 and imaging mirror 49 can each be seen in FIG. 11.

The mirror deployment system 80 described above uses extension link and compression link assemblies 84 and 86, respectively, to reduce jitter in the image produced by the display unit 40 while the display unit 40 is in use in a vehicle. Moreover, the system 80 deploys the fold mirror 48 when the imaging mirror 49 is released and deployed, thereby negating the need to open the mirrors separately. Furthermore, the system reduces rattle of the fold mirror 48 and the deployment components. Such rattle could be caused by the movement of the vehicle in which the display unit 40 is being used. Any backlash or loose tolerances in the deployment of the fold mirror 48 are also reduced in both the recessed and deployed positions.

Figure 12:
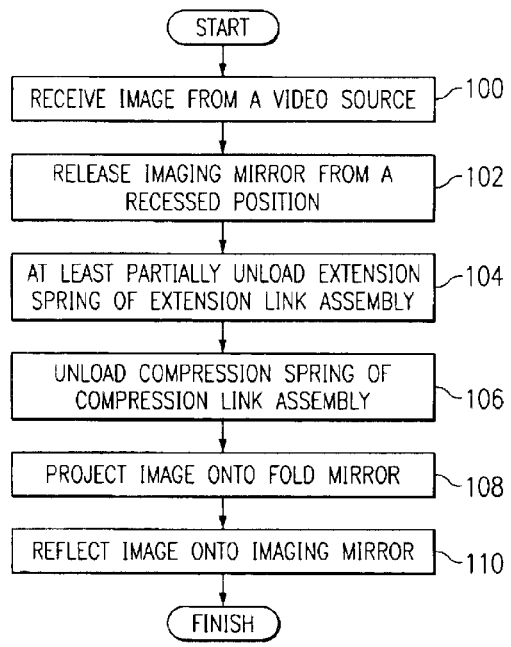
FIG. 12 is a flowchart illustrating a method for displaying an image at a display unit, in accordance with an embodiment of the present invention.

FIG. 12 is a flowchart illustrating a method for displaying an image at a display unit, in accordance with an embodiment of the present invention. The method begins at step 100 where an image is received from a video source. The video source may be coupled to the display unit. The video source may comprise a camera unit of an auxiliary vision system of a vehicle. At step 102, an imaging mirror is released from a recessed position. The imaging mirror is coupled to an extension link assembly.

At step 104, an extension spring of the extension link assembly is at least partially unloaded to cause lateral movement of the extension link assembly. Such lateral movement rotates the imaging mirror from a recessed position to an at least partially deployed position. At step 106, a compression spring of a compression link assembly is unloaded. The compression link assembly is coupled to a fold mirror such that when the compression spring is unloaded, the fold mirror rotates from a recessed position to a deployed position.

At step 108, the image is projected onto the fold mirror. The image may comprise a scene captured by a camera unit of an auxiliary vision system of a vehicle. At step 110, the image is reflected onto the imaging mirror for viewing by the user, such as the driver of a vehicle in which the display unit is installed.

Steps may be modified, added or omitted without departing from the scope of the invention. Additionally, steps may be performed in any suitable order without departing from the scope of the invention.

Although the present invention has been described in detail, various changes and modifications may be suggested to one skilled in the art. It is intended that the present invention encompass such changes and modifications as falling within the scope of the appended claims.

What is claimed is:

1. A mirror assembly deployment system of a display unit, comprising:
   an imaging mirror;
   an extension link assembly coupled to the imaging mirror, the extension link assembly comprising an extension spring coupled to a housing of the display unit;
   a compression link assembly coupled to the extension link assembly, the compression link assembly comprising a compression spring;
   a fold mirror coupled to the compression link assembly;
   wherein the extension spring is configured to at least partially unload when the imaging mirror is released from a recessed position to cause the imaging mirror to rotate to an at least partially deployed position; and
   wherein the compression spring is configured to unload when the extension spring at least partially unloads to cause the fold mirror to rotate from a recessed position to a deployed position.

2. The system of claim 1, further comprising a pivot assembly coupled to the extension link assembly and to the compression link assembly to unload the compression spring of the compression link assembly.

3. The system of claim 1, further comprising a hinge coupled to the imaging mirror, the hinge configured to slide in a slot of the extension link assembly to further rotate the imaging mirror.

4. A system for displaying an image at a display unit, comprising:
   an imaging mirror;
   an extension link assembly coupled to the imaging mirror, the extension link assembly comprising an extension spring coupled to a housing of the display unit;
   a compression link assembly coupled to the extension link assembly, the compression link assembly comprising a compression spring;
   a fold mirror coupled to the compression link assembly;
   wherein the extension spring is configured to at least partially unload when the imaging mirror is released from a recessed position to cause the imaging mirror to rotate to an at least partially deployed position;
   wherein the compression spring is configured to unload when the extension spring at least partially unloads to cause the fold mirror to rotate from a recessed position to a deployed position; and
   a video source coupled to the display unit to transmit the image to the display unit for reflection by the fold mirror toward the imaging mirror.

5. The system of claim 4, further comprising a pivot assembly coupled to the extension link assembly and to the compression link assembly to unload the compression spring of the compression link assembly.

6. The system of claim 4, further comprising a hinge coupled to the imaging mirror, the hinge configured to slide in a slot of the extension link assembly to further rotate the imaging mirror.

7. The system of claim 4, wherein the video source comprises a camera unit of an auxiliary vision system of a vehicle.

8. The system of claim 7, wherein the camera unit comprises:
   a lens system operable to direct energy from a scene toward a detector;
   wherein the detector comprises an array of detector elements each operable to receive energy from a portion of the scene and to convert the received energy into information representative of the received energy and to send the information associated with at least some of the detector elements to the display unit.

9. The system of claim 4, wherein the video source comprises a global positioning satellite system.

10. The system of claim 4, wherein the display unit comprises a liquid crystal display operable to project the image onto the fold mirror for reflection toward the imaging mirror.

11. A method for deploying a mirror assembly of a display unit, comprising:
   releasing an imaging mirror from a recessed position, the imaging mirror coupled to an extension link assembly;
   at least partially unloading an extension spring of the extension link assembly thereby causing lateral movement of the extension link assembly to rotate the imaging mirror from a recessed position to a first position; and
   unloading a compression spring of a compression link assembly coupled to a fold mirror of the mirror assembly thereby causing rotation of the fold mirror from a recessed position to a first position.

12. The method of claim 11, further comprising rotating the imaging mirror from the first position to a second position suitable for presenting an image to a user.

13. The method of claim 11, wherein rotating the imaging mirror from the first position to the second position comprises sliding a hinge coupled to the imaging mirror within a slot of the extension link assembly.

14. The method of claim 11, wherein unloading a compression spring of a compression link assembly comprises rotating a pivot assembly coupled to the extension link assembly and to the compression link assembly to unload the compression spring of the compression link assembly.

15. A method for displaying an image at a display unit, comprising:
   receiving an image from a video source coupled to the display unit;
   releasing an imaging mirror from a recessed position, the imaging mirror coupled to an extension link assembly;
   at least partially unloading an extension spring of the extension link assembly thereby causing lateral movement of the extension link assembly to rotate the imaging mirror from a recessed position to an at least partially deployed position;
   unloading a compression spring of a compression link assembly coupled to a fold mirror of the mirror assembly thereby causing rotation of the fold mirror from a recessed position to a deployed position;
   projecting the image onto the fold mirror; and
   reflecting the image onto the imaging mirror.

16. The method of claim 15, wherein receiving an image from a video source comprises receiving an image from a camera unit of an auxiliary vision system of a vehicle.

17. The method of claim 16, wherein receiving an image from a camera unit of an auxiliary vision system of a vehicle comprises:
   directing energy from a scene towards a detector;
   receiving energy from a portion of the scene at each of a plurality of detector elements;
   converting the energy received at each detector element into information representative of the received energy; and
   forming a visible image using the information representative of the received energy.

18. The method of claim 15, wherein receiving an image from a video source comprises receiving an image from a global positioning satellite system.

* * * * *